US007835856B2

(12) United States Patent
Hay et al.

(10) Patent No.: US 7,835,856 B2
(45) Date of Patent: Nov. 16, 2010

(54) METHOD AND SYSTEM FOR TELEMATICS LOCATION SENSING

(75) Inventors: Curtis L. Hay, Clarkston, MI (US); Brian W. Fillwock, Chesterfield Township, MI (US)

(73) Assignee: General Motors LLC, Detroit, MI (US)

( * ) Notice: Subject to any disclaimer, the term of this patent is extended or adjusted under 35 U.S.C. 154(b) by 1078 days.

(21) Appl. No.: 10/972,499

(22) Filed: Oct. 25, 2004

(65) Prior Publication Data
US 2006/0089791 A1 Apr. 27, 2006

(51) Int. Cl.
*G01C 21/26* (2006.01)
(52) U.S. Cl. ............... 701/207; 340/988; 701/216; 701/217; 342/457
(58) Field of Classification Search ......... 701/207–209, 701/216, 220, 36, 48; 342/357.01–357.06, 342/357.1, 357.14
See application file for complete search history.

(56) References Cited

U.S. PATENT DOCUMENTS

| | | | |
|---|---|---|---|
| 4,899,285 A * | 2/1990 | Nakayama et al. ......... 701/220 |
| 5,323,152 A * | 6/1994 | Morita .................... 340/988 |
| 5,416,712 A * | 5/1995 | Geier et al. ............... 701/216 |
| 5,436,840 A * | 7/1995 | Lam et al. ................ 701/208 |
| 5,488,559 A * | 1/1996 | Seymour ................. 701/208 |
| 5,490,073 A * | 2/1996 | Kyrtsos .................. 701/207 |
| 5,525,998 A * | 6/1996 | Geier .................... 342/357.14 |
| 5,644,317 A * | 7/1997 | Weston et al. ........... 342/357.14 |
| 5,745,868 A * | 4/1998 | Geier .................... 701/216 |
| 5,961,571 A * | 10/1999 | Gorr et al. ............... 701/207 |
| 5,974,356 A * | 10/1999 | Doyle et al. ............. 701/209 |
| 6,014,610 A * | 1/2000 | Judge et al. .............. 702/92 |
| 6,041,280 A * | 3/2000 | Kohli et al. .............. 701/201 |
| 6,047,234 A * | 4/2000 | Cherveny et al. .......... 701/200 |
| 6,085,147 A * | 7/2000 | Myers ................... 701/209 |
| 6,249,542 B1 * | 6/2001 | Kohli et al. .............. 375/150 |
| 6,642,884 B2 * | 11/2003 | Bryant et al. ............ 342/357.1 |
| 6,643,587 B2 * | 11/2003 | Brodie et al. ............ 701/216 |
| 6,675,081 B2 * | 1/2004 | Shuman et al. ........... 701/48 |
| 6,766,233 B2 * | 7/2004 | Odinak et al. ............ 701/36 |
| 6,810,323 B1 * | 10/2004 | Bullock et al. ........... 701/206 |
| 7,333,052 B2 * | 2/2008 | Maskell ................. 342/195 |
| 2002/0005802 A1 * | 1/2002 | Bryant et al. ........... 342/357.01 |
| 2002/0030625 A1 * | 3/2002 | Cavallaro et al. ........ 342/357.06 |
| 2002/0133271 A1 * | 9/2002 | McDermott et al. ......... 701/1 |
| 2003/0123531 A1 * | 7/2003 | Kohli et al. .............. 375/150 |
| 2005/0064895 A1 * | 3/2005 | Oesterling et al. ........ 455/553.1 |
| 2006/0089791 A1 * | 4/2006 | Hay et al. ............... 701/207 |
| 2006/0224318 A1 * | 10/2006 | Wilson et al. ........... 701/213 |
| 2007/0156312 A1 * | 7/2007 | Breed et al. ............. 701/29 |
| 2008/0040029 A1 * | 2/2008 | Breed .................. 701/208 |

* cited by examiner

*Primary Examiner*—Thomas G Black
*Assistant Examiner*—Wae Louie

(57) ABSTRACT

The present invention provides a method of operating a telematics device within a mobile vehicle communication system to provide a current telematics device geographic location. The method includes receiving odometer information including velocity information for a specified time period, and receiving positional information including velocity information for a specified time period. The method further includes determining a first distance traveled value based on the received odometer information and determining a second distance traveled value based on the received positional information. The method additionally includes selecting one of the first and second distance traveled values as a primary distance traveled value based on predetermined criteria, and determining a current telematics device geographic location based on the primary distance traveled value. The odometer information may include velocity information from a powertrain sensor. The positional information may include velocity information from one or more wheel sensors.

7 Claims, 4 Drawing Sheets

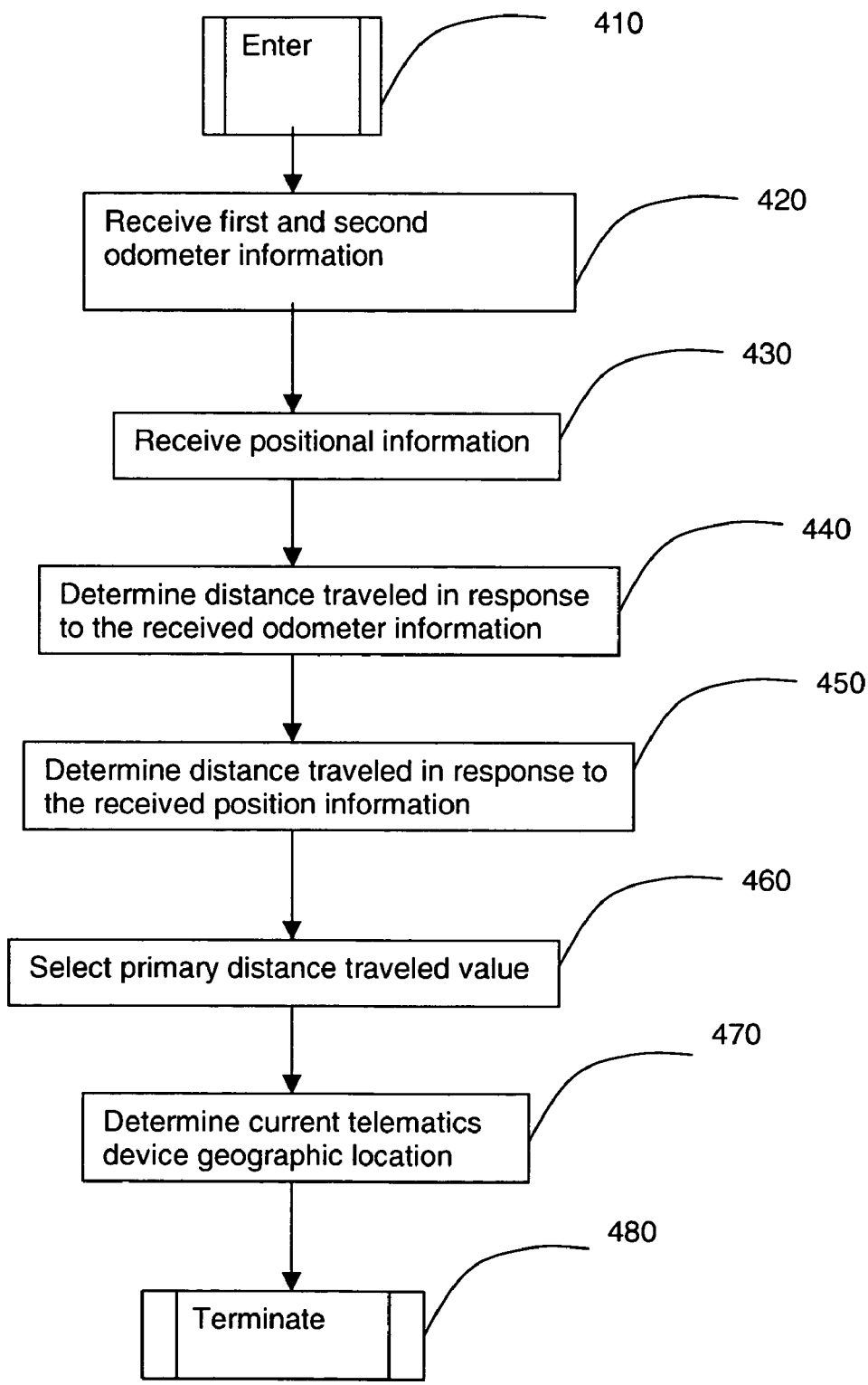

METHOD AND SYSTEM FOR TELEMATICS LOCATION SENSING

FIELD OF THE INVENTION

This invention relates generally to wireless communications. More specifically, the invention relates to a method and system for telematics location sensing.

BACKGROUND OF THE INVENTION

The opportunity to utilize wireless features is ever increasing as cellular transceivers are being transformed into entertainment as well as communication platforms. One such cellular transceiver is a wireless feature included within wireless vehicle communication and networking services for a mobile vehicle. Another such cellular transceiver includes capabilities to receive satellite broadcasts such as, for example, Global Positioning System (GPS) signals and satellite radio signals.

Typically, wireless systems within mobile vehicles (e.g., telematics units) provide voice communication. These wireless systems have also been utilized to update systems within telematics units such as, for example, radio station presets. Recently, additions have included the ability to provide positioning information and extra entertainment via the use of satellite reception capabilities.

Cellular transceivers operate within communication systems, for example, a telematics unit within a mobile vehicle operating within a mobile vehicle communication system (MVCS). Cellular transceivers operating within communication systems can receive large amounts of electromagnetic traffic including, but not limited to, wireless communications, GPS signals, satellite signals, and the like.

Unfortunately, there are certain locations where GPS signals are not reliable. To improve location determinations within these areas, many GPS systems rely on dead reckoning (DR). The DR process combines satellite measurements with additional sources of location information such as inertial gyroscopes, accelerometers, compass information, and wheel speed sensors. For best DR performance, GPS satellite measurements must be augmented with additional speed and heading information. These data when combined can predict the absolute location of a vehicle (expressed as a latitude and longitude) when GPS measurements are either unreliable or unavailable. Accurate speed and heading information will reliably predict (for short periods of time) changes in vehicle velocity and the direction in which the vehicle is traveling. A need exists for improved accuracy in the information used to determine the telematics equipped vehicle's position for presentation to a user or service provider when GPS service is interrupted.

The present invention advances the state of the art in accurately determining a vehicle's geographic location.

SUMMARY OF THE INVENTION

One aspect of the invention includes a method of operating a telematics device within a mobile vehicle communication system to provide a current telematics device geographic location. The method includes receiving odometer information including velocity information for a specified time period, and receiving positional information including velocity information for a specified time period. The method further includes determining a first distance traveled value based on the received odometer information and determining a second distance traveled value based on the received positional information. The method additionally includes selecting one of the first and second distance traveled values as a primary distance traveled value based on predetermined criteria, and determining a current telematics device geographic location based on the primary distance traveled value.

In accordance with another aspect of the invention, a computer readable medium storing a computer program for operating a telematics device within a mobile vehicle communication system to provide a current telematics device geographic location includes: computer readable code for providing received odometer information including velocity information for a specified time period; computer readable code for providing received positional information including velocity information for a specified time period; computer readable code for determining a first distance traveled value based on the received odometer information; computer readable code for determining a second distance traveled value based on the received positional information; computer readable code for selecting one of the first and second distance traveled values as a primary distance traveled value based on predetermined criteria; and computer readable code for determining a current telematics device geographic location based on the primary distance traveled value.

In accordance with yet another aspect of the invention, a system for operating a telematics device within a mobile vehicle communication system to provide a current telematics device geographic location is provided. The system includes means for receiving odometer information including velocity information for a specified time period. The system additionally includes means for receiving positional information including velocity information for a specified time period. Means for determining a first distance traveled value based on the received odometer information and means for determining a second distance traveled value based on the received positional information are provided. Means for selecting one of the first and second distance traveled values as a primary distance traveled value based on predetermined criteria and means for determining a current telematics device geographic location based on the primary distance traveled value are also provided.

In accordance with yet another aspect of the invention, a method of determining vehicle location includes receiving a first and second odometer information and receiving a positional information, the positional information including velocity information. The method further includes determining a first distance traveled value based on the first and second odometer information and determining a second distance traveled value based on the received positional information. One of the first and second distance traveled values is selected as a primary distance traveled value based on a tolerance value a current telematics device geographic location is determined based on the primary distance value traveled.

The aforementioned and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 4 is a flow diagram of one embodiment of a method of operating a vehicle telematics device to provide a current telematics device geographic location, in accordance with the present invention.

DETAILED DESCRIPTION OF THE PRESENTLY PREFERRED EMBODIMENTS

Figure 1:
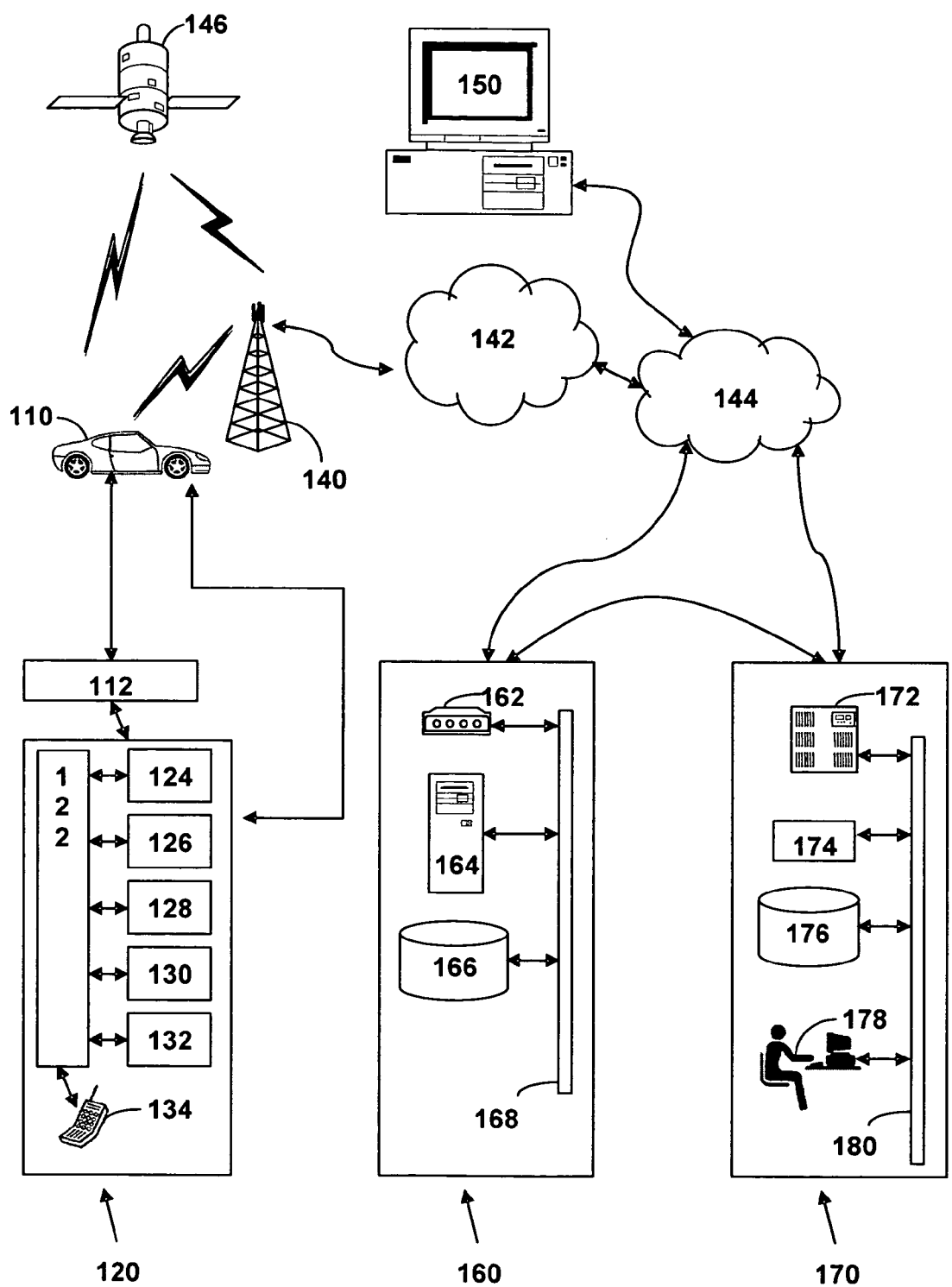
FIG. 1 illustrates an operating environment for implementing wireless communication within a mobile vehicle communication system.

FIG. 1 illustrates one embodiment of an operating environment for implementing wireless communication within a mobile vehicle communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is referred to as a mobile vehicle in the discussion below. In operation, MVCU 110 may be implemented as a motor vehicle, a marine vehicle, or as an aircraft. MVCU 110 may include additional components not relevant to the present discussion.

Vehicle communication network 112 sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. Telematics unit 120 may include additional components not relevant to the present discussion.

In one embodiment, processor 122 is implemented as a microcontroller, controller, digital signal processor (DSP), host processor, or vehicle communications processor. In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band (2.3 GHz) that has been allocated by the U.S. Federal Communications Commission (FCC) for nationwide broadcasting of satellite-based Digital Audio Radio Service (DARS).

In operation, broadcast services provided by satellite broadcast system 146 are received by telematics unit 120. In one embodiment, broadcast services include various formatted programs based on a package subscription obtained by the user and managed by telematics unit 120. In another embodiment, broadcast services include various formatted data packets based on a package subscription obtained by the user and managed by call center 170. In yet another embodiment, broadcast services include various generically formatted data packets regularly transmitted by satellite broadcast system 146. In an example, generically formatted data packets such as, for example, pseudo-random code received by telematics unit 120, are processed by processor 122. In this example, pseudo-random code received by telematics unit 120 is processed into GPS coordinates by processor 122, such as by trilateration, and provided to telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more land-line telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110.

In operation, a client utilizes computer 150 to initiate setting or re-setting of user preferences for MVCU 110. In one embodiment, a client utilizes computer 150 to provide radio station presets as user preferences for MVCU 110. In an example, user-preference data from client-side software is transmitted to server-side software of web-hosting portal 160. In this example, user-preference data is stored at web-hosting portal 160. In another example, user-preference data from client-side software is transmitted to server-side software of web-hosting portal 160. In this example, user-preference data is stored at web-hosting portal 160 and later transmitted to MVCU 110 via wireless carrier system 140 or satellite broadcast system 146. In another example, user-preference data is transmitted directly to MVCU 110 via wireless carrier system 140 or satellite broadcast system 146.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, communications assistance, and real-time traffic updates. Communication services manager 174 receives service-preference requests for a variety of services from the client via computer 150, web-hosting portal 160, and land network 144. Communication services manager 174 transmits user-preference and other data such as, for example real-time traffic updates, primary diagnostic script, and the like to telematics unit 120 in MVCU 110 through wireless carrier system 140, communication network 142, land network 144, satellite broadcast system 146, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic updates, directory assistance, roadside assistance, business or residential assistance, information services assistance, emergency assistance, automated vehicle diagnostic function, and communications assistance. Communication services advisor 178 communicates with telematics unit 120 through wireless carrier system 140, communication network 142, and land network 144 using voice transmissions, or through satellite broadcast system 146, communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140 and satellite broadcast system 146. In this embodiment, an inbound communication is routed to call center 170 from telematics unit 120 via wireless carrier system 140, communication network 142, and land network 144.

Figure 2:
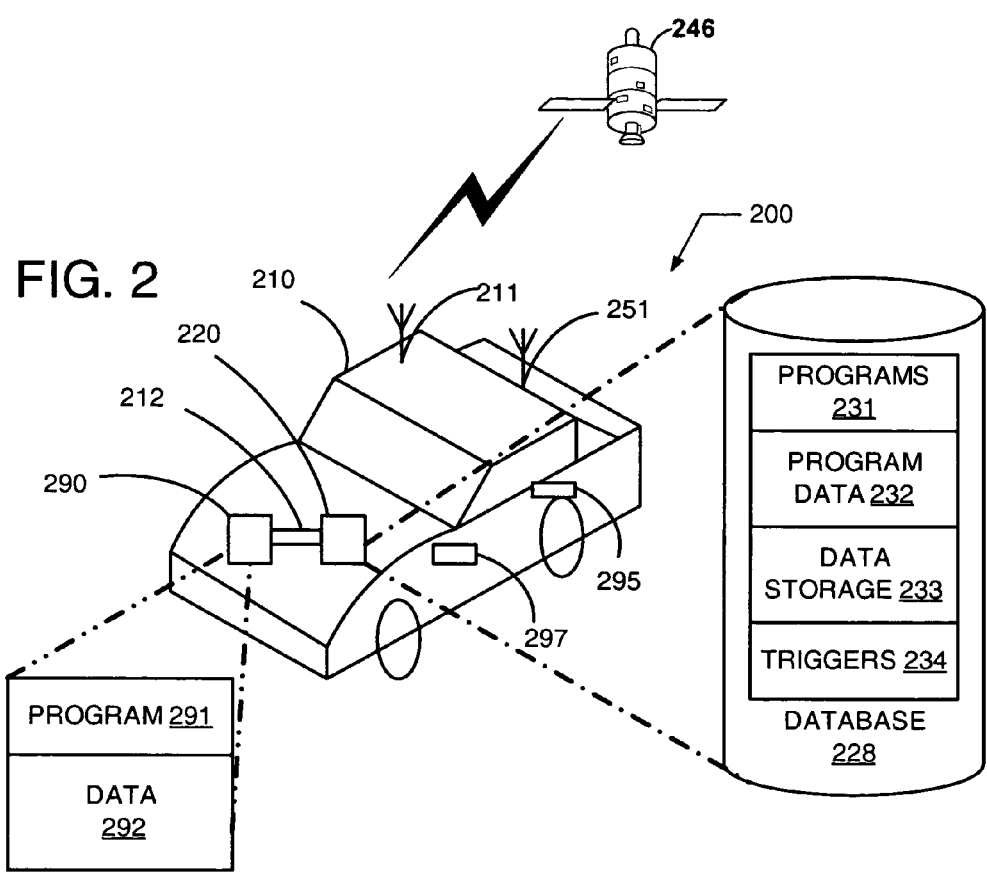
FIG. 2 is a block diagram of a telematics-based system in accordance with an embodiment of the present invention.

FIG. 2 is a block diagram of a telematics-based system in accordance with an embodiment of the present invention. FIG. 2 shows a telematics-based system 200 for operating a vehicle telematics device as a satellite signal receiver.

In FIG. 2, the system includes a mobile vehicle 210. Mobile vehicle 210 includes a telematics unit 220 coupled to one or more vehicle system modules 290 via a vehicle communication network 212. Additionally, mobile vehicle 210 includes a telematics unit 220 coupled to (not shown) sensors 295, and 297. Mobile vehicle 210 additionally includes a primary antenna 211 and a satellite antenna 251. Primary antenna 211 is coupled (not shown) to telematics unit 220 to communicate with a wireless carrier system. Satellite antenna 251 is coupled (not shown) to telematics unit 220 to receive communications from satellite broadcast system 246. In another embodiment, a single antenna, for example primary antenna 211, performs the functions of a primary antenna and a satellite antenna.

Telematics unit 220 further includes a database 228 that contains programs 231, program data 232, data storage 233, and triggers 234. A vehicle system module (VSM) 290 is included within mobile vehicle 210 and further includes a program 291 and data 292. In one embodiment, VSM 290 within mobile vehicle 210 is located within telematics unit 220. In FIG. 2, the elements are presented for illustrative purposes and are not intended to be limiting. Telematics-based system 200 may include additional components not relevant to the present discussion.

Telematics unit 220 is any telematics device enabled for operation with a telematics service provider such as, for example, telematics unit 120 as described with reference to FIG. 1. Telematics unit 220 in vehicle 210 is in communication with a service provider (e.g., a "service center"). Telematics unit 220 includes volatile and non-volatile memory components for storing data and programs. In one embodiment, memory components in telematics unit 220 contain database 228.

Database 228 includes one or more programs 231 for operating telematics unit 220, for example, for operating a vehicle telematics device as a satellite signal receiver. In operation, program 231 receives instructions and data in the form of a data stream from a service provider or commands from a user interface (not shown) at data storage 233. Program 231 executes the instructions such as, for example, by parsing the data stream/user interface instructions for additional instructions as well as data and triggers. In one embodiment, program 231 parses the data stream/user interface instructions and stores triggers at triggers 234. In this embodiment, program 231 transfers data to and receives data from VSM 290 for execution. In an example, program 231 parses the data stream/user interface instructions and determines a current telematics device geographic location.

VSM 290 is any vehicle system control module having software and hardware components for operating, controlling, or monitoring one or more vehicle systems and sensors. In one embodiment, VSM 290 provides location information and is a global positioning system (GPS) module such as, for example, GPS unit 126 of FIG. 1. In another embodiment, VSM 290 is a control module for receiving sensor information and processing the received sensor information, for example, for receiving sensor information from sensors 295 and 297.

Sensors 295 and 297 are coupled (not shown) to telematics unit 220 and provide velocity information. In another embodiment, sensors 295 and 297 are coupled (not shown) to VSM 290, which is operating as a control module for receiving sensor information and processing the received sensor information. In an example, sensor 295 is implemented as one or more wheel sensors providing positional information. In this example, sensor 297 is implemented as a power-train sensor providing odometer information. In one embodiment, such odometer information includes serial data messages transmitted at routine intervals across a vehicle communication network 212 that describe the speed of the vehicle at a specific moment in time. In an example, vehicle communication network 212 is a vehicle communication network 112 as described in FIG. 1, above. In another embodiment, odometer information includes serial data messages transmitted at predetermined time intervals that provide the basis for estimating the speed of a vehicle during the predetermined time.

Vehicle system module 290 contains one or more processors, one or more memory devices, and one or more connection ports. In one embodiment, VSM 290 includes a software switch for scanning received sensor information such as, for example, positional information and odometer information to identify that data have been received. VSM 290 is coupled to vehicle communication network 212 and, therefore, to any other device that is also coupled to vehicle communication network 212.

In one embodiment, VSM 290 is directly coupled to telematics unit 220 in primary mobile vehicle 210, for example, vehicle communication network 212 coupling telematics unit 220 to vehicle system module 290. In another embodiment, VSM 290 is indirectly coupled to telematics unit 220.

In illustrative operation, when VSM 290 is implemented as a global positioning system (GPS) module that cannot receive GPS signals, a trigger within triggers 234 initiates a program within program 231 to determine the current telematics device geographic location based on the previous location and additionally based on odometer information and positional information received from sensors 295 and 297.

Figure 3:
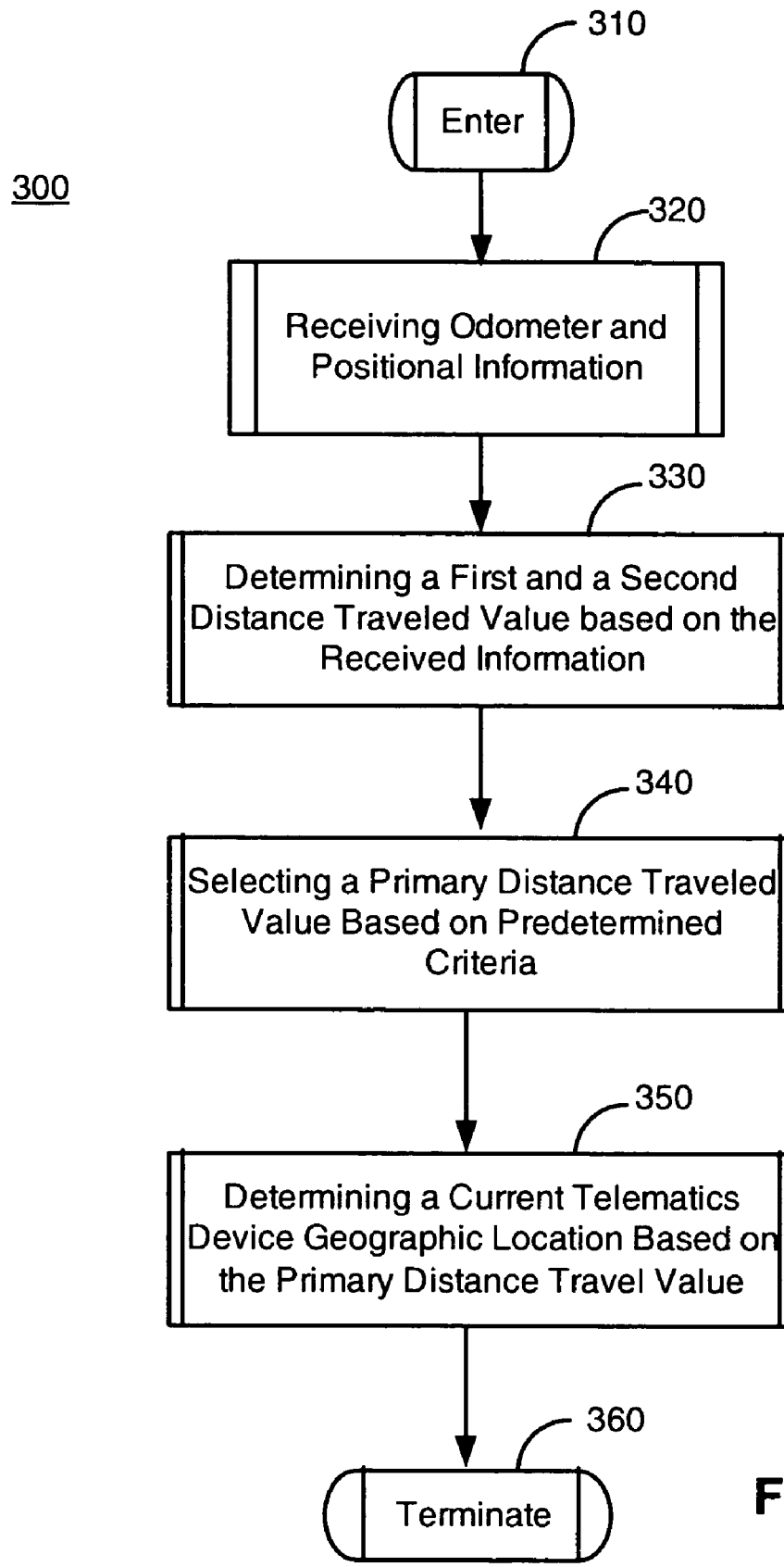
FIG. 3 is a flow diagram of one embodiment of a method of operating a vehicle telematics device to provide a current telematics device geographic location, in accordance with the present invention.

FIG. 3 is a flow diagram of one embodiment of a method of determining a current telematics device geographic location within a mobile vehicle communication system. In FIG. 3, method 300 may utilize one or more systems and concepts detailed in FIGS. 1 and 2, above. The present invention can also take the form of a computer usable medium including a computer program for operating a telematics device within a mobile vehicle communication system to provide a current telematics device geographic location. The program stored in the computer usable medium includes computer program code for executing the method steps described in FIG. 3. In FIG. 3, method 300 begins at step 310.

At step 320, odometer information and positional information are received. Odometer information may include velocity information for a specified time period. In another embodiment, velocity information is determined in response to at least two odometer pulses and the time elapsed between the pulses. Positional information includes velocity information for a specified time period. In one embodiment, the odometer information may include velocity information from a power-train sensor. In an example and referring to FIG. 2 above, telematics unit 220 receives odometer information from power-train sensor 297 wherein the power-train sensor may condition the odometer information including velocity information. In another embodiment, the positional information includes velocity information from one or more wheel sensors. In an example and referring to FIG. 2 above, telematics unit 220 receives positional information from wheel sensor(s) 295. In an example, odometer information includes serial data messages transmitted at routine intervals across the vehicle communication network that describe the speed of the vehicle at a specific moment in time. In an example, the serial data messages are constructed by computing the number of odometer pulses generated by a vehicle transaxle during a given interval of time and converting that pulse count to a periodic message in a specific data format Odometer pulses are electronic pulses generated from a sensor within a vehicle that are calibrated for a number of transitions from a logical one to a logical zero per a unit distance, such as a mile or a kilometer. For example, if the odometer provides 5280 pulses per mile, this resolves to one pulse per foot. In one embodiment, odometer pulses are generated by counting the number of revolutions of a flywheel or other rotational component in a vehicle when the vehicle drivetrain is fully engaged and the vehicle is in forward motion. The counted number of revolutions are calibrated to a unit distance. In one embodiment, odometer pulses are available over a vehicle bus (FIG. 1, 112). In other embodiments odometer pulses are hardwired to vehicle instrumentation and displays.

In another example, an ABS (Antilock Braking System) module may provide conditioned differential wheel speed information. The differential wheel speed information may be conditioned to provide distance information analogous to odometer information.

At step 330, a first distance traveled value and a second distance traveled value are determined based on the received information. The first distance traveled value is determined based on the received odometer information. The second distance traveled value is determined based on the received positional information.

In one embodiment, the determined first distance traveled value is based on a normalized product of the velocity information and the specified time period included within the odometer information. This methodology is known in the industry. In another embodiment, the determined second distance traveled value includes utilizing Earth Centered Earth Fixed (ECEF) methodology incorporating the received positional information. ECEF methodology is known in the industry.

At step 340, one of the distance traveled values is selected as a primary distance traveled value based on predetermined criteria. In one embodiment, selecting one of the distance traveled values as the primary distance traveled value based on predetermined criteria includes comparing the first distance traveled value to the second distance traveled value, selecting the second distance traveled value as the primary distance traveled value when the difference between the first distance traveled value and the second distance traveled value is less than or equal to a predetermined tolerance value, and selecting the first distance traveled value as the primary distance traveled value when the difference between the first distance traveled value and the second distance traveled value is greater than the predetermined tolerance value. In one embodiment, the tolerance value is three meters In another embodiment, selecting one of the distance traveled values as the primary distance traveled value based on predetermined criteria includes comparing the first distance traveled value and the second distance traveled value to a predetermined threshold distance traveled value, and selecting the first distance traveled value as the primary distance traveled value when either distance traveled value is less than the predetermined threshold distance traveled value.

At step 350, a current telematics device geographic location is determined based on the primary distance traveled value. In one embodiment, determining the current telematics device geographic location based on the primary distance traveled value includes receiving the selected primary distance traveled value, receiving a previously determined telematics device geographic location, and determining the current telematics device geographic location as the previously determined geographic position when the received primary distance traveled value is less than or equal to a predetermined distance traveled value threshold.

In another embodiment, determining the current telematics device geographic location based on the primary distance traveled value includes receiving the selected primary distance traveled value, receiving a previously determined telematics device geographic location, and determining the current telematics device geographic location utilizing the previously determined telematics device geographic location and the selected primary distance traveled value.

At step 360, the method is terminated.

FIG. 4 is a flow diagram of one embodiment of a method of determining a current telematics device geographic location. In FIG. 4, method 400 may utilize one or more systems and concepts detailed in FIGS. 1 and 2, above. The present invention can also take the form of a computer usable medium including a computer program for operating a telematics device within a mobile vehicle communication system to provide a current telematics device geographic location. The program stored in the computer usable medium includes computer program code for executing the method steps described in FIG. 4. In FIG. 4, method 400 begins at step 410. The method begins by determining a current telematics device geographic location. In one embodiment, the current telematics device geographic location is determined by previous iterations of method 400.

A first and second odometer information are received at step 420. The first and second odometer information, in one embodiment, are odometer pulses indicating a distance traveled information, such as positional information and velocity information, or both.

A positional information is received at step 430. In one embodiment, positional information is received from a GPS unit. Positional information includes velocity information in one embodiment. Positional information also includes a dilution of precision value in one embodiment. Positional information includes a latitude and a longitude value and a time stamp in one embodiment. In another embodiment, positional information includes a heading value.

A first distance traveled value is determined based on the first and second odometer information in step 440. The first distance traveled value is responsive to the distance traveled as indicated by the odometer information. For example, when the first and second odometer information indicate that the vehicle has traveled 50 feet between the first and second odometer information, the first distance traveled value is 50 feet.

A second distance traveled value is determined based on the positional information in step 450. The second distance traveled value is responsive to the distance traveled as indicated by the positional information. For example, when the positional information indicates that the vehicle has traveled 50 feet, the second distance traveled value is 50 feet.

A primary distance traveled value is selected at step 460. Selecting the primary distance traveled value includes comparing the first and second distance traveled values and determining if the difference between the first and second distance traveled values exceeds a tolerance value. The tolerance value is a predetermined value set to indicate that a positional value is not a reliable indicator of current vehicle location. In one embodiment, the tolerance value is 3 meters. In one embodiment, the first distance traveled value is selected as the primary distance traveled value when the difference between the first and second distance traveled values exceeds the tolerance value. In one embodiment, when the distance computed using a GPS unit differs from the distance determined by odometer pulses by more than a threshold value, the distance determined by the odometer pulses is used to determine distance traveled. For example, if the GPS receiver is blocked or is subject to partial blockage typically experienced in an urban canyon environment, and if the quality of the distance measurement based on two or more GPS readings diminishes as indicated by a discrepancy of more than two meters relative to the calculated distance determined by the odometer readings, then the distance computed by the odometer readings is used to determine vehicle position until the GPS receive distance measurement returns below the threshold of two meters.

A current telematics device geographic location is determined based on the primary distance traveled at step 470. The determination of current telematics device geographic location includes adding the primary distance traveled value to the location previously determined. In one embodiment, the determination includes use of heading information determined from the positional information.

Method 400 terminates at step 480.

In one embodiment, method 400 iterates at a predetermined frequency. For example, method 400 iterates at 60 Hz, in one embodiment. In another embodiment, method 400 iterates at a rate responsive to a current vehicle speed as indicated by either the positional information or the odometer information or both.

The above-described methods and implementation for operating a vehicle telematics device to provide telematics location sensing are example methods and implementations. These methods and implementations illustrate one possible approach for operating a vehicle telematics device to provide telematics location sensing. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

What is claimed is:

1. A method of determining a current telematics device geographic location in the absence of valid GPS data, the method comprising:
   receiving first odometer information and second odometer information and receiving positional information, the positional information including velocity information;
   determining a first estimated distance traveled value based on the first and second odometer information and determining a second estimated distance traveled value based on the received positional information;
   selecting one of the first and second estimated distance traveled values as a primary distance traveled value by comparing the first and second estimated distance traveled values and determining if the difference between the first and second estimated distance traveled values exceeds a predetermined tolerance value; and
   determining a current telematics device geographic location based on the selected primary distance traveled value in the absence of valid GPS data.

2. The method of claim 1, wherein the velocity information is derived from a power-train sensor.

3. The method of claim 1, wherein the second odometer information is derived from one or more wheel sensors.

4. The method of claim 1, wherein the determined first estimated distance traveled value is based on a normalized product of the first velocity information and the specified time period included within the odometer information.

5. The method of claim 1, wherein the determined second estimated distance traveled value includes utilizing Earth Centered Earth Fixed methodology incorporating the received positional information.

6. The method of claim 1, wherein selecting one of the first and second estimated distance traveled values as a primary distance traveled value further comprises:
   selecting the second estimated distance traveled value as the primary distance traveled value when the difference between the first estimated distance traveled value and the second estimated distance traveled value is less than or equal to a predetermined tolerance value; and selecting the first estimated distance traveled value as the primary distance traveled value when the difference between the first estimated distance traveled value and the second estimated distance traveled value is greater than the predetermined tolerance value.

7. The method of claim 1 wherein selecting one of the first and second estimated distance traveled values as a primary distance traveled value based on a tolerance value further comprises selecting the first estimated distance traveled value when the difference between the first and second estimated distance traveled values exceeds the tolerance value.

* * * * *